(No Model.)
L. DANNHAUSER.
BRIDLE.
No. 455,480. Patented July 7, 1891.
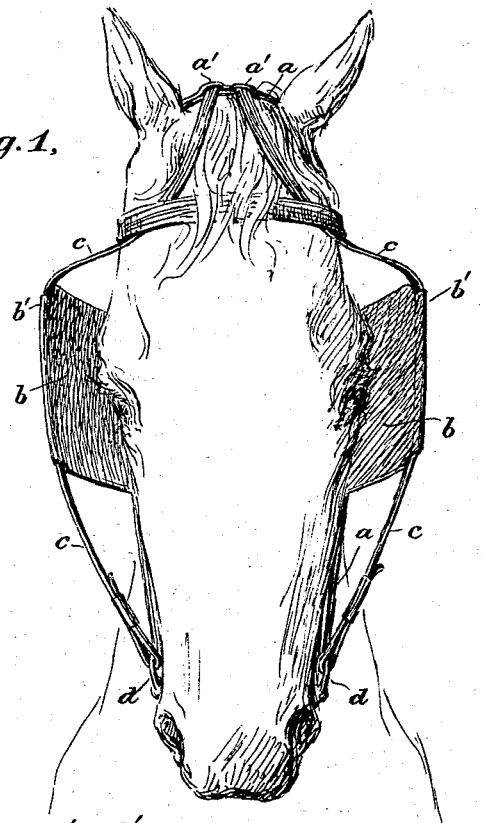
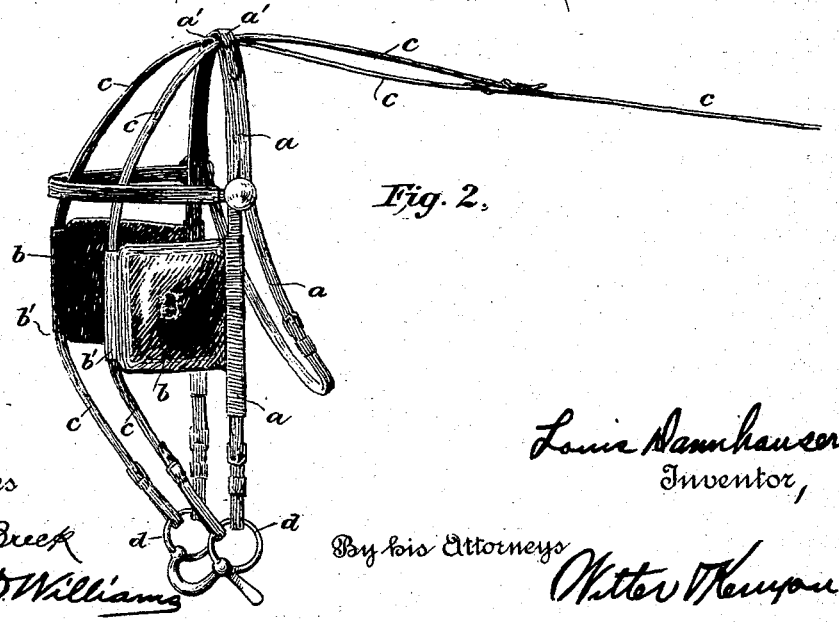

UNITED STATES PATENT OFFICE.

LOUIS DANNHAUSER, OF MUNICH, GERMANY.

BRIDLE.

SPECIFICATION forming part of Letters Patent No. 455,480, dated July 7, 1891.

Application filed April 7, 1891. Serial No. 388,035. (No model.)

*To all whom it may concern:*

Be it known that I, LOUIS DANNHAUSER, a citizen of the United States, and a resident of Munich, Bavaria, Germany, have invented certain new and useful Improvements in Harness, of which the following is a specification, reference being had to the accompanying drawings, forming part thereof.

This invention relates to harness for horses and other animals of draft; and it consists of a certain improved construction of such harness, whereby horses may be effectually prevented from running away. This object is accomplished by providing improved means for operating the winkers, blinders, or eye-covers, so as to close or shut them over the eyes of the animals, and thus to effectually blind them.

In the accompanying drawings, Figure 1 is a front view showing my improved harness in place upon a horse. Fig. 2 is a side view of the harness.

My improvements are adapted to be applied to an ordinary bridle provided with ordinary reins and the eye-covers usually denominated as winkers or blinders, but necessitates slight changes in the construction thereof.

A bridle is shown in the drawings constructed according to my invention, and its headstall is lettered $a$. The winkers $b$ are attached to the cheek-piece of the bridle in the usual manner, and may or may not be provided with the ordinary straps to hold them up alongside of the eyes of the animal. To operate these winkers according to my invention, I provide additional reins connected to the winkers and arranged so as when operated to close the winkers over the eyes of the animals. Two such reins $c\,c$ are shown, each attached at one end to one of the snaffles $d$. The reins $c\,c$ pass freely and loosely through loops $b'\,b'$ in the front portions of the winkers $b$, and then through guides $a'\,a'$ at the top of the headstall $a$ of the bridle. The reins $c\,c$ are brought together and united at any convenient point, and thence pass as one rein, either with the ordinary reins or separately from such reins, to any convenient part of the wagon or to the hand of the driver.

The construction shown in the drawings and above particularly described embodies my complete invention.

The operation of my invention is effected by pulling upon the reins $c\,c$. The tension thus applied closes the winkers $b\,b$ tightly down upon the eyes of the animal. The reins $c\,c$ slip through the loops in the winkers $b\,b$, and are pulled toward the center line of the head of the animal, and thus the winkers are not only closed over the eyes of the animal, but are pressed tightly down over its eyes.

One of the advantages of this invention is that the operating-reins do not in any degree interfere with the vision of the animal. In fact, these operating-reins occupy about the same position and present the same appearance as some forms of the straps or stays ordinarily used to hold the winkers or blinders in position. The use of my invention does not, therefore, disfigure the harness; but, on the contrary, a harness containing my invention can be made ornamental to a high degree. The direction of tension when the reins $c\,c$ are operated is such as to tightly close and hold the winkers over the eyes of the animal, and also at the same time to exert considerable force, tending to pull and hold the bit up into the mouth of the animal, thus effectually preventing displacement of the bit and greatly assisting to bring the animal under control.

What I claim, and desire to secure by Letters Patent, is—

1. The combination, with the headstall of a bridle for animals having ordinary reins, and with eye-covers attached to such headstall, of additional reins attached to the headstall near the bit and passing loosely through loops in the eye-covers and through guides at the top of the headstall, whereby the eye-covers may be closed over the eyes of the animal, substantially as set forth.

2. The combination, with the headstall of a bridle for animals, and with the eye-covers $b$ attached thereto, of the reins $c\,c$, attached to the snaffles of the bridle and passing loosely through the loops $b'\,b'$ in the eye-covers and through guides $a'\,a'$ at the top of the headstall, substantially as set forth.

LOUIS DANNHAUSER.

Witnesses:
 HENRY D. WILLIAMS,
 WILBUR B. DRIVER.